United States Patent [19]

Slaugh et al.

[11] 4,229,374

[45] Oct. 21, 1980

[54] AMINE PROCESS USING CU-SN-NA CATALYST

[75] Inventors: Lynn H. Slaugh; Galeon W. Schoenthal, both of Houston, Tex.

[73] Assignee: Shell Oil Company, Houston, Tex.

[21] Appl. No.: 53,119

[22] Filed: Jun. 28, 1979

Related U.S. Application Data

[63] Continuation-in-part of Ser. No. 28,030, Apr. 9, 1979, abandoned, which is a continuation of Ser. No. 844,093, Oct. 17, 1977, abandoned.

[51] Int. Cl.$^3$ ............... C07C 85/06; C07C 85/08; B01J 23/72
[52] U.S. Cl. ............... 260/563 R; 252/454; 252/463; 252/476; 260/563 C; 260/570.5 CA; 260/570.8 R; 260/570.9; 260/583 R
[58] Field of Search ............... 252/476, 463, 454; 260/583 R, 585 B, 585 C, 563 R, 563 C, 570.5 CA, 570.8 R, 570.9

[56] References Cited

U.S. PATENT DOCUMENTS

| | | | |
|---|---|---|---|
| 3,128,311 | 4/1964 | Shirley et al. | 260/585 B |
| 3,234,283 | 2/1966 | Finch et al. | 260/583 R |
| 3,383,417 | 5/1968 | Lichtenwalter | 260/584 R |
| 3,520,933 | 7/1970 | Adam et al. | 260/585 C |
| 3,692,701 | 9/1972 | Box | 252/463 X |
| 3,948,997 | 4/1976 | Howe et al. | 252/476 X |
| 4,010,238 | 3/1977 | Shiraishi et al. | 252/476 X |
| 4,035,410 | 7/1977 | Marion et al. | 252/476 X |
| 4,036,883 | 7/1977 | Voges et al. | 260/585 B |
| 4,040,980 | 8/1977 | Matsuda et al. | 252/463 X |
| 4,148,824 | 4/1979 | Hoffmann et al. | 260/585 B |

FOREIGN PATENT DOCUMENTS

| | | | |
|---|---|---|---|
| 48-85511 | 11/1973 | Japan | 260/585 B |
| 49-81306 | 8/1974 | Japan | 260/585 B |
| 436414 | 10/1935 | United Kingdom | 260/585 B |

*Primary Examiner*—John Doll
*Attorney, Agent, or Firm*—Howard W. Haworth

[57] ABSTRACT

Tertiary amines are produced by reacting aliphatic, cycloaliphatic or araliphatic alcohols, aldehydes or ketones with ammonia, primary or secondary amines in the presence of a catalyst having improved selectivity and stability and which comprises a mixture of copper, tin and an alkali metal supported on a suitable carrier.

18 Claims, No Drawings

AMINE PROCESS USING CU-SN-NA CATALYST

This application is a continuation-in-part of copending application Ser. No. 28,030, filed Apr. 9, 1979, abandoned, which is a continuation of application Ser. No. 844,093, filed Oct. 17, 1977, now abandoned.

BACKGROUND OF THE INVENTION

This invention is concerned with a process for making tertiary amines by reacting alcohols, aldehydes or ketones with ammonia, primary, or secondary amines in the presence of a catalyst comprising copper, tin and alkali metal supported on a carrier.

FIELD OF THE INVENTION

Alcohols, aldehydes or ketones are reacted with ammonia, primary or secondary amines to selectively produce tertiary amines utilizing a supported Cu/Sn/Na catalyst according to the following reactions:

$$3ROH + NH_3 \rightarrow R_3N + 3H_2O \quad (1)$$

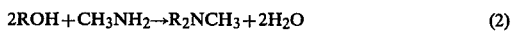
$$2ROH + CH_3NH_2 \rightarrow R_2NCH_3 + 2H_2O \quad (2)$$

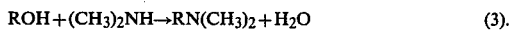
$$ROH + (CH_3)_2NH \rightarrow RN(CH_3)_2 + H_2O \quad (3).$$

wherein aldehydes or ketones can be substituted for the alcohol (ROH) and other amines substituted for the methyl amines. In the reactions of the instant invention it can be seen that the alkyl moiety of the alcohol replaces all of the hydrogen on the reactant ammonia or amine.

One critical aspect of the catalyst utilized in the instant process is that the catalyst must have a low disproportionation activity. If the catalyst utilized causes substantial disproportionation of the alkyl groups in the product amines with each other or with the reactant amines, then the products will be a mixture of amines and not the specific amines of the instant invention.

For example, in considering equation 3 above, a catalyst with high disproportionation activity would a product mixture containing $R_2NH$, $RN(CH_3)H$, $RN(CH_3)_2$, $R_2NCH_3$ instead of the desired $RN(CH_3)_2$.

It is believed that in the instant process for equations 1 and 2, the process proceeds in steps, e.g., for equation (1):

$$ROH + NH_3 \rightarrow RNH_2 + H_2O \quad (1a)$$

$$ROH + RNH_2 \rightarrow R_2NH + H_2O \quad (1b)$$

$$ROH + R_2NH \rightarrow R_3N + H_2O \quad (1c).$$

and for equation (2):

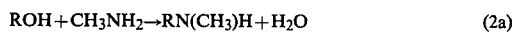
$$ROH + CH_3NH_2 \rightarrow RN(CH_3)H + H_2O \quad (2a)$$

$$ROH + RN(CH_3)H + \rightarrow R_2NCH_3 + H_2O \quad (2b).$$

Again the catalyst must not cause substantial disproportionation between any of the reactant, intermediate or product amines. Further, the catalyst must be such that it drives the reaction to completion and not stop at any intermediate stage. Thus, a catalyst that stops at stage (1b) or (2a) would be useful for producing secondary amines, but would not be useful for producing tertiary amines. Of course, a catalyst which produces some intermediate stage amines (such as stage 1b or 2a) would be useful since the intermediate amines could be recycled for complete conversion.

There are many copper-based amination catalysts cited in the literature, but none produce the high selectivities to tertiary amines as the catalyst of the instant process. Howe et al (U.S. Pat. No. 3,948,997, issued Apr. 6, 1976) teaches the use of supported copper-tin catalysts but not for making tertiary amines. Voges et al (U.S. Pat. No. 4,036,883, issued July 19, 1977) generically teaches the use of copper-based catalysts promoted by, among others, alkali metals and group IV metals for amination. The Voges et al process is directed to the production of primary amines from alcohols and ammonia. Applicant has discovered that out of the Voges et al broad generic disclosure, one catalyst is unexpectedly superior for producing tertiary amines.

SUMMARY OF THE INVENTION

This invention provides a process for producing tertiary amines by reacting alcohols, aldehydes or ketones with ammonia, primary or secondary amines in the presence of a specific catalyst by replacing the hydrogen on the reactant ammonia or amine with the alkyl moiety of the reactant alcohol, aldehyde or ketone. The catalyst comprises a mixture of copper, tin and an alkali metal supported on a suitable carrier. This catalyst has the advantage of long life and high selectivity for the production of tertiary amines. The catalyst further has extremely low disproportionation activity which permits intermediately produced amines to be recycled thereby increasing tertiary amine product yield.

DESCRIPTION OF THE PREFERRED EMBODIMENTS

The Catalyst

The catalyst of this invention is utilized supported upon a suitable carrier. The weight percent of the copper (basis copper metal to total catalyst weight) preferably ranges from about 0.05% w to about 50% w preferably from about 0.5% w to about 20% w and more preferably from about 1% w to about 10% w. The weight percent of the tin (basis tin metal to total catalyst weight) preferably ranges from about 0.05% w to about 50% w preferably about 0.5% w to about 20% w and more preferably from about 0.5% w to about 5% w. The weight percent of the alkali metal ranges from about 0.003 to about 30% w, preferably from about 0.01 to about 10% w and more preferably from about 0.2% w to about 5% w. The catalyst will be in the form of oxides, metals or mixtures thereof.

The alkali metals are the group IA metals of the periodic Table and are provided as salts of those metals, e.g. salts of lithium, sodium, potassium, rubidium, and cesium. Sodium salts are preferred.

The carriers suitable for the present process are selected from the conventional porous, heat-resistant carriers, which are also resistant to the starting mixture to be used and the products formed in the reaction under the reaction conditions. The carrier may be natural or synthetic. Very suitable supports comprise those of siliceous and/or aluminous compositions. Specific examples of suitable supports are the aluminum oxides, charcoal, pumice, magnesia, zirconia, Kieselguhr, fullers' earth, silicon carbide, porous agglomerates comprising silica and/or silicon carbide, selected clays, artificial and natural zeolites, ceramics, etc. Refractory supports particularly useful in the preparation of catalysts in accordance with this invention comprise the siliceous and/or aluminous materials in particular those containing gamma-alumina.

The catalyst can be prepared in a number of suitable ways, as for example, by coprecipitation of the metal components on a powdered or pelleted carrier or by coprecipitation with the carrier from aqueous solution with, for example sodium carbonate or sodium hydroxide. A preferred method is to impregnate the carrier with a solution of suitable salts of the active metals, and then to subsequently dry and calcine the impregnated carrier at temperatures ranging from about 100° C. to about 600° C. A preferred solvent is water, but certain organic solvents would also be suitable. Salts of the active metals soluble in the solvent are readily determined fom common reference books. Useful salts for aqueous systems are chlorides, bromides, nitrates, alkonoates, acetates, lactates and the like. Alkali metal stannates and stannites are particularly useful for providing both tin and alkali metal, and alkali metal hydroxides are useful for providing alkali metals. Alternatively, solutions of salts of active metal and carrier could be spray dried and calcined at temperatures from about 100° C. to about 600° C. Irrespective of the method used to prepare the supported catalyst, it must be calcined in an oxidizing environment, preferably air at sufficiently high temperature to convert the metals to substantially the metal oxides generally from about 100° C. to about 600° C.

The catalysts used in this invention are activated before use by heating in a reducing atmosphere, for example, in hydrogen or ammonia. The preferred atmosphere is hydrogen. Activation temperatures range from about 100° to about 600° C., preferably from about 250° C. to about 600° C. The time needed for activation will depend on the temperature, the higher the temperature, the shorter the time. Typically, useful times have been found to range from about 0.1 hours to about 24 hours, although times outside these limits are also useful, economic considerations, however, tending to dictate against their use.

The Process

Preferred reactant hydrocarbon materials are aliphatic, cycloaliphatic, or araliphatic alcohols, ketones or aldehydes having up to twenty-five, preferably up to twenty carbon atoms. These starting materials may be unsaturated, containing for example one or two olefinic double bonds. They also may contain substituents which are inert under the reaction conditions, such as alkyl groups having one to four carbon atoms which are attached via ether bridges. Particular industrial importance attaches to aliphatic or cycloaliphatic alcohols having up to twenty carbon atoms. Examples of suitable alcohols/aldehydes are ethanol/al, propanol/al, isopropanol, butanol/al, isobutanol/al, 2-ethylhexanol/al, decanol/al, dodecanol/al, hexadecanol/al, cyclopentol, cyclohexanol, cyclooctanol, cyclododecanol, benzyl alcohol/aldehyde, phenylethyl alcohol/aldehyde, 1,4-butanediol/al, 1,6-hexanediol/al, 1,5-pentadiol/al, 1,8-octanediol/al and the like. Examples of suitable ketones are acetone, methylethyl ketone, methylisobutyl ketone, phenylmethyl ketone, phenylethyl ketone, 3-decanone, 5-dodecanone, cyclopentanone, cyclohexanone, cyclooctanone, cyclododecanone and the like.

Preferred reactant amine materials are primary or secondary amines. Alkylamines, cycloalkylamines, or aralkylamines having one to twelve carbon atoms, particularly alkylamines having one to four carbon atoms and one amine group in the molecule is preferred. Examples of suitable amines are monomethylamine, dimethylamine, methylethylamine, monoethylamine, diethylamine, and the like. Preferred reactant amines are monomethylamine and dimethylamine.

The reactant alcohols, aldehydes or ketones are advantageously reacted with at least an stoichiometric amount of ammonia or reactant amines and are also advantageously used in excess, for example, up to 50, preferably up to 20 moles of ammonia or reactant amine per reactant hydroxyl or carbonyl group. The amount of ammonia or reactant amine utilized will range from stoichiometric to about 10 times stoichiometric more preferably from about stoichiometric to about 5 times stoichiometric and even more preferably from stoichiometric to about thrice stoichiometric. Absolute values will depend on whether ammonia, primary and secondary reactant amines are used since for each a different stoichiometric amount is required (see equations 1, 2 and 3).

The reactant alcohols, aldehydes or ketone react with the ammonia or reactant primary or secondary amines by replacing a hydrogen on the ammonia or reactant amine with the alkyl (i.e. the aliphatic, cycloaliphatic or araliphatic) moiety of the alcohol, aldehyde or ketone. One, two or three hydrogens are so replaced from secondary reactant amine, primary reactant amine or ammonia, respectively.

The reaction is advantageously carried at temperatures of from about 160° C. to about 350° C. Preferred temperatures range from about 180° C. to about 300° C. and even more preferably from about 250° to about 300° C. Reaction pressures range from about 15 psi to about 4000 psi, and preferably from about 150 psi to about 1000 psi. It is preferred to carry out the reaction in the presence of hydrogen. It is advantageous to use partial pressures of hydrogen of from about 10 psi to about 3000 psi, preferably from about 100 psi to about 1000 psi. It is advantageous to use a hydrogen to alcohol, aldehyde or ketone molar ratio greater than one. The reaction system may also be partially pressurized with inert gases such as nitrogen, argon.

The reaction may be conducted batchwise or in a continuous operation. By way of illustration of the batchwise process, a high-pressure, stirred autoclave is charged with alcohol, aldehyde, or ketone, reactant amine, or ammonia and catalyst, pressurized with hydrogen, and heated to reaction temperature. After the reaction is allowed to proceed for the desired length of time, the autoclave is cooled, the excess hydrogen vented, and the products worked up by conventional methods. By way of illustration of continuous operation, a vertical, high-pressure column is charged with catalyst, and alcohol and reactant amine are supplied at the top. At the same time hydrogen is metered into the column in cocurrent or countercurrent flow. The hydrogen is advantageously recycled. During the reaction, appropriate conditions of temperature and pressure are maintained. The reaction product is removed from the bottom of the column, freed from hydrogen and worked up by conventional methods. An alternate continuous process entails allowing the reaction mixture in which the catalyst is dispersed to trickle over fillers or baffles in a tower.

The process of this invention is described by the following illustrative embodiments which are provided for illustration and are not to be construed as limiting the invention.

ILLUSTRATIVE EMBODIMENT I: THE CATALYST

A solution prepared from 16 g of copper nitrate, $Cu(NO_3)_2 \cdot 3H_2O$ and 15 ml of $H_2O$ was used to impregnate 45 g of 18×30 mesh alumina (surface area 263 m$^2$/gm; pore volume 0.26 cc/g). The impregnation was performed with good mixing to assure an even distribution of salt on the alumina. The impregnated alumina was placed in a vertical tube and 400 ml/min of air passed over it as the temperature was gradually increased in 30 minute periods at the following sequences of temperatures: 80° C., 100° C., 125° C., 150° C., 175° C., 200° C., 250° C., 300° C., 400° C., and 500° C. The calcined material was cooled to room temperature and impregnated with 3 g of sodium stannate in 18 ml of $H_2O$. The above calcination process was repeated and then the catalyst was subsequently reduced in stages from 125°–500° C. over a period of 2 hours with a nitrogen-diluted hydrogen gas mixture.

ILLUSTRATIVE EMBODIMENT II: THE PROCESS

EXAMPLE I

A catalyst was prepared by impregnating 45 gm of Reynolds RA-1 alumina (18×30 mesh, surface area about 260 m$^2$/gm, pore volume about 0.26 cc/g) with a solution of 16 g of copper nitrate in 16 ml of $H_2O$. The material was calcined as above and reimpregnated with a solution of stannous tartrate in 1 ml of $H_2O$ and 1 ml of $HNO_x$. The reimpregnated material was calcined and reduced as in Illustrative Embodiment I above. The catalyst (10 cc) was charged to a trickle phase reactor and dimethylamine and laureldehyde were fed to the reactor at a liquid hourly space velocity (LHSV) of 1.1 and a molar ratio of amine to aldehyde of 3:1. The reactor was maintained at a temperature of 180° C. Hydrogen was metered into the reactor at a rate of 100 cc/min (STP) and the pressure was maintained at 375 psig. After 1 hour of operation the conversion (molar) of aldehyde was 98.9% and selectivity (molar) to dimethyldodecylamine was 77.3%. After two hours of operation, conversion was 100% and selectivity was 70%.

EXAMPLE 2

A catalyst was prepared by impregnating 48 gm of Reynolds RA-1 alumina (18×30 mesh) with a solution prepared by warming 4.6 g copper nitrate with 20 ml of $NH_4OH$ and then adding 1 g of sodium stannate. This material was calcined and reduced as in Illustrative Embodiment I above. The catalyst contained 2.4% w Cu, 0.71% w Sn and 0.7% w Na. The catalyst (10 cc) was charged to a trickle phase reactor having a volume of 25 cc and dimethyl amine and dodecanol were fed to the reactor at an LHSV of 1.1 and a molar ratio of amine to alcohol of 3:1. The reactor was maintained at a temperature of about 250° C. Hydrogen was metered into the reactor at a rate of 100 cc/min and the pressure was maintained at 375 psig. After 2.5 hours of operation, the molar conversion of alcohol was 95.4% and the molar selectivity to dimethyldodecylamine was 78%.

EXAMPLE 3

A catalyst was prepared by impregnating 30 gm of Reynolds RA-1 alumina with 2 g of copper nitrate dissolved in 15 ml of $NH_4OH$ to which was then added 0.5 g of sodium stannate. The catalyst was calcined and reduced as Illustrative Embodiment I above. The catalyst contained 4% w Cu, 1.2% w Sn and 0.87% wt Na. The catalyst (10 cc) was charged to a trickle phase reactor having a volume of 25 cc and dimethylamine and 1-dodecanol were fed to the reactor at an LHSV of 1.1 and a molar ratio of amine to alcohol of 1.4:1. The reactor temperature was maintained at 244° C. Hydrogen was metered into the reactor at a rate of 100 cc/min (STP) and the pressure was maintained at 375 psig. After 1.5 hours of operation, the molar conversion of alcohol was 60.3% and the molar selectivity to dimethyldodecylamine was 94%. The reactor temperature was raised to 250° C. and after 1.5 hours, conversion was 79.1% and selectivity to dimethyldodecylamine was 89.4%. After 2.5 hours of operation, the molar conversion of alcohol was 82% and the molar selectivity to dimethyldodecylamine was 88.9.

Repeating the above procedure, with the same catalyst, but using a feed of dimethylamine, trimethylamine and 1-dodecanol in a molar ratio of 3:2.3:1 produced a conversion after 2.5 hours of operation of 89.7 and a selectivity to dimethyldodecylamine of 85.7%.

EXAMPLE 4

A catalyst was prepared by adding 1.5 g sodium stannate in 10 ml $H_2O$ to 24 g of 18×30 mesh $Al_2O_3$ (RA-1) and then calcined and reduced as in Illustrative Embodiment I. It contained 2.9% w Sn and 0.9% w Na. The catalyst (10 cc) was charged to a trickle phase reactor having a volume of 25 cc and dimethylamine and 1-dodecanol were fed to the reaction at a LHSV of 1.1 and a molar ratio of amine to alcohol of 3:1. Hydrogen was metered into the reactor at a rate of 100 cc/min (STP) and the pressure was maintained at 375 psig. At a reactor temperature of 257° C. no conversion of alcohol was noted. At 300° C. (1 hour of operation) a 9% molar conversion of alcohol was noted with about an equal distribution between methyldodecylamine and dimethyldodecylamine.

EXAMPLE 5

A catalyst was prepared by the method as illustrated in Embodiment I. The catalyst contained 7.6% w Cu, 2.7% w Sn and 0.9% w Na. The catalyst (10 cc) was charged to a trickle phase reactor (25 cc volume) and dimethylamine and 1-dodecanol were fed to the reactor at an LHSV of 0.6 and molar ratio of amine to alcohol of 3:1. Hydrogen was metered into the reactor at a rate of 180 cc/min (STP) and the pressure was maintained at 400 psig. Results are given in the table below.

| Cumulative Run Time (Hrs) | Reactor Temp. °C. | Molar Conversion of Alcohol | Selectivity to Dimethyl-dodecylamine |
| --- | --- | --- | --- |
| 15.3 | 218 | 30.3% m | 100% m |
| 17.8 | 239 | 88.6 | 97.5 |
| 23.4 | 247 | 97.4 | 96.9 |
| 42.4 | 248 | 93.7 | 96.6 |

EXAMPLE 6

A catalyst was prepared by the method of Illustrative Embodiment I. The catalyst contained 8.3% w Cu, 2.3% w Sn and 1% w Na. The catalyst (10 cc) was charged to a trickle phase reactor having a volume of 25 cc and dimethylamine and n-butanol were fed to the reactor at an LHSV of 1.1 and a molar ratio of amine to alcohol of 3:1. Hydrogen was metered into the reactor at a rate of 100 cc/min. and pressure was maintained at 375 psig. At a reactor temperature of 250° C. and after 1 hour operation the alcohol conversion was 68.8% m and selectivity to dimethylbutylamine was approximately 100% m. At 273° C. and after 1 hour, the conversion was 93.4% m and selectivity was greater than 99% m.

EXAMPLE 7

A series of catalysts were prepared according to Illustrative Embodiment I above with the exception that the reduction was carried out in the reactor under one atmosphere of hydrogen for ten minutes at both 100° C. and 150° C., and finally for thirty minutes at 200° C. The alcohol utilized was n-hexadecanol and the amine was monomethylamine. Samples were taken after four hours of operation an analyzed for products. Different reaction conditions were studied and the results are given in Tables 1–4 below.

TABLE I
EFFECT OF CATALYST COMPOSITION ON REACTION RATE AND PRODUCT SELECTIVITY

Reaction:
ROH + $CH_3NH_2$ → $R_2NCH_3$ + $RNHCH_3$ + Disporportionation Products
R = $C_{16}H_{33}$ Reaction Conditions
Temperature = 270° C.
Pressure = 200 psig $H_2$
$CH_3NH_2$:ROH = 1:1

| Experiment | Cu/Sn/Na | | | LHSV | Conv. | Selectivity (wt %) | | |
|---|---|---|---|---|---|---|---|---|
| | | | | | | $R_2NCH_3$ | $RNHCH_3$ | Disp. Prod. |
| 7-1 | 5.13 | 2.15 | .92 | 1.1 | 92.5 | 89.4 | 7.4 | 3.2 |
| 7-2 | 5.06 | 4.77 | 1.46 | 1.2 | 30.7 | 78.8 | 18.0 | 3.2 |
| 7-3 | 4.97 | 1.03 | 0.53 | 2.6 | 89.7 | 82.6 | 8.5 | 8.9 |
| 7-4 | 9.33 | 1.92 | 0.83 | 2.6 | 85.3 | 88.0 | 6.8 | 5.2 |
| 7-5 | 9.50 | 4.00 | 1.25 | 0.9 | 53 | 88.1 | 7.6 | 4.4 |

TABLE II
EFFECT OF REACTION TEMPERATURE ON THE ALCOHOL AMINATION REACTION

Reaction Conditions:
Pressure = 375 psig $H_2$
LHSV = 1.1
$CH_3NH_2$:ROH = 1:1
Catalyst = 4.52% Cu/1.41% Sn/0.88% Na on $Al_2O_3$

| Experiment | Temp. | Conv. | Selectivity (wt %) | | |
|---|---|---|---|---|---|
| | | | $R_2NCH_3$ | $RNHCH_3$ | Disp. Prod. |
| 7-6 | 250 | 81.6 | 67.2 | 28.4 | 4.3 |
| 7-7 | 270 | 94.3 | 85.1 | 7.0 | 7.9 |

TABLE III
EFFECT OF REACTION PRESSURE ON THE ALCOHOL AMINATION REACTION

Reaction Conditions:
Temperature = 270° C.
LHSV = 1.1

| Experiment | Cu/Sn/Na | | | Pressure | Conv. | Selectivity (wt %) | | |
|---|---|---|---|---|---|---|---|---|
| | | | | | | $R_2NCH_3$ | $RNHCH_3$ | Disp. Prod. |
| 7-8 | 5.13 | 2.15 | .92 | 375 | 97.2 | 86.3 | 7.3 | 6.4 |
| 7-9 | 5.13 | 2.15 | .92 | 200 | 97.2 | 85.7 | 7.9 | 6.4 |
| 7-10 | 5.13 | 2.15 | .92 | 50 | 82.3 | 90.8 | 4.0 | 5.2* |

*Product also contained 1 mole % of an unknown amine product

TABLE IV
EFFECT OF AMINE-TO-ALCOHOL RATIO ON THE ALCOHOL AMINATION REACTION

Reaction Conditions:
Temperature = 270
Pressure = 375 psig $H_2$
LHSV = 1.1
Catalyst = 5% Cu:2% Sn:0.88 Na on $Al_2O_3$ (Nominal)

| Experiment | Amine/Alcohol | Conv. | Selectivity (wt %) | | | LHSV | Cu | Sn | Na |
|---|---|---|---|---|---|---|---|---|---|
| | | | $R_2NCH_3$ | $RNHCH_3$ | Disp. Prod. | | | | |
| 7-11 | 1.1 | 94.3 | 85.1 | 7.0 | 7.9 | 1.1 | 4.52 | 1.41 | .88 |
| 7-12 | 2:1 | 98.7 | 58.1 | 24.7 | 17.2 | 1.1 | 4.52 | 1.41 | .88 |
| 7-13 | 0.8:1 | 84.8 | 88.2 | 6.8 | 5.0 | 2.2 | 5.0 | 2.05 | .85 |
| 7-14 | 0.7:1 | 79.5 | 89.5 | 5.0 | 5.6 | 2.2 | 5.0 | 2.05 | .85 |

EXAMPLE 8

1.1 G stannous tartrate dissolved in 1 ml $H_2O + 1$ ml $HNO_3$ combined with 16 g copper nitrate dissolved in 16 ml with $H_2O$ was used to impregnate 45 g $Al_2O_3$ (RA-1). This material was calcined as per Illustrative Embodiment I. It contained 7.1% w Cu, 0.94% w Sn and 0.4% w Na. The catalyst was charged to a trickle phase reactor and ammonia and 1-dodecanol were fed to the reactor in a molar ratio of 3.5:1 and a LHSV of 1.1. Hydrogen was metered into the reactor at a rate of 100 cc/min (STP) and the pressure was maintained at 375 psig. The results are shown below.

| Reactor Temp. | Run Time | Alcohol Conversion | Selectivity | |
|---|---|---|---|---|
| | | | Didodecylamine | Tridodecylamine |
| 208° C. | 2 hrs. | 73.8% m | 42.6% m | 34.3% m |
| 208 | 4 | 63.0 | 39.6 | 40.4 |
| 232 | 0.5 | 78.6 | 48.4 | 43.3 |
| 232 | 1.5 | 85.4 | 35.0 | 54.0 |
| 232 | 2 | 83.4 | 31.1 | 64.2 |

EXAMPLE 9

Example 8 was repeated using a catalyst containing 7.6% w Cu, 3.1% w Sn and 1.6% w Na. The feed was ammonia and 1-dodecanol in a molar ratio of 1.5:2. The results follow below:

| Reactor Temp. | Run Time | Alcohol Conversion | Selectivity | |
|---|---|---|---|---|
| | | | Didodecylamine | Tridodecylamine |
| 283° C. | 1.5 hrs. | 47.9% m | 5.4% m | 94.6% m |
| 313 | 2 | 52.6 | 9 | 91 |
| 317 | 3.7 | 77.2 | 10.8 | 89.2 |

EXAMPLE 10

The above experiment was repeated using a catalyst containing 7.1% w Cu, 0.94% w Sn, and 0.4% w Na. The feed was changed to ammonia and phenol in a molar ratio of 10:1. No conversion of the phenol was noted at temperatures ranging from 204° C. to 305° C.

EXAMPLE 11

A catalyst was prepared similar to that of Illustrative Embodiment I but using a support of silica gel (Davison Grade 57, surface area of 300 m²/g, pore volume of 1.0 cc/gm and density of 0.4 mg/cc). This catalyst contained 5.6% Cu, 2.9% Sn and 1.2% Na. This catalyst (10 cc) was charged to a trickle phase reactor and dimethylamine and 1-dodecanol were fed to the reactor at an LHSV of 1.1 and a molar ratio of amine to alcohol of 3:1. Hydrogen was metered into the reactor at a rate of 100 cc/min (STP) and the pressure was maintained at 400 psig. The results are shown below.

TABLE

| Cu/Sn/Na on Silica Catalysts | | | | |
|---|---|---|---|---|
| Temp. °C. | Run Time, Hrs. | Alcohol Conv., % m | Selectivity, % m | |
| | | | $R(CH_3)_2N$ | $R_2NCH_3$ |
| 240 | 2.5 | 83.4 | 96.7 | 3.3 |
| 245 | 3 | 95.4 | 94.6 | 5.9 |

EXAMPLE 12

For comparative purposes, two catalyst were prepared as per Illustrative Embodiment I above, using to prepare one catalyst copper-nitrate and tin octoate and using copper nitrate, tin octoate and sodium hydroxide for the other. Tested using the feedstocks and conditions of Example 11, the following results were obtained.

| Catalyst (on Al₂O₃) | | | Run Temp. °C. | Run Time, Hrs. | Alcohol Conv., % m | Selectivity, % m | | |
|---|---|---|---|---|---|---|---|---|
| Cu | Sn | Na | | | | $R(CH_3)_2N$ | $RCH_3NH$ | $R_2CH_3N$ |
| 5 | 1.7 | — | 250 | 2 | 91.7 | 86.6 | 2.3 | 11.1 |
| 5 | 1.7 | .8 | 250 | 2 | 91.2 | 95.0 | — | 5.0 |

EXAMPLE 13

A catalyst was prepared similar to that of Illustrative Embodiment I but using only copper nitrate and sodium hydroxide. The catalyst contained 5.4% w Cu and 1.5% w Na on alumina (RA-1). This catalyst (10 cc) was charged to a trickle phase reactor and dimethylamine and 1-dodecanol were fed to the reactor at an LHSV of 1.1 and a molar ratio of amine to alcohol of 3.1. Hydrogen was metered into the reactor at a rate of 100 cc/min (STP) and the pressure was maintained at 375 psig. The results are shown in the Table below.

TABLE

| Cu/Na on Alumina Catalyst | | | | | |
|---|---|---|---|---|---|
| Temp., °C. | Run Time, Hrs. | Alcohol Conv., % m | Selectivity, % mol | | | |
| | | | $R(CH_3)_2N$ | $RCH_3NH$ | $R_2CH_3N$ | $R_2NH$ |
| 230 | 2 | 74.9 | 72.1 | 19.3 | 8.6 | — |
| 230 | 3.5 | 78.9 | 71.3 | 18.7 | 8.4 | 1.6 |
| 240 | 2 | 94.9 | 69.8 | 17.9 | 10.8 | 1.4 |

The above was repeated using only copper nitrate to prepare a catalyst containing 3.34% w copper on alumina (RA-1). The results are given below.

| Temp. °C. | Run Time, Hrs. | Alcohol Conv., % m | Selectivity, % m | | | |
|---|---|---|---|---|---|---|
| | | | $R(CH_3)_2N$ | $RCH_3NH$ | $R_2CH_3N$ | $R_2NH$ |
| 220 | 2 | 56.7 | 84.1 | 8.5 | 6.3 | 1.1 |
| 230 | 3 | 81.2 | 77.9 | 12.8 | 8.2 | 1.3 |

What is claimed is:

1. A catalyst for the production of tertiary amines by reacting aliphatic, cycloaliphatic or araliphatic alcohols, aldehydes or ketones having up to twenty-five carbon atoms with ammonia, primary or secondary amines having from one to eight carbon atoms wherein the alkyl moiety of the alcohol, aldehyde or ketone replaces the hydrogen(s) on the ammonia, primary or secondary amines which comprises from about 0.05 to about 50 percent by weight of copper, from about 0.05 to about 50 percent by weight of tin and from about 0.003 to about 30 percent by weight of an alkaline metal supported on a porous carrier.

2. The catalyst of claim 1 wherein the copper ranges from about 0.5 to about 20 percent by weight, the tin ranges from about 0.5 to about 20 percent by weight and the alkali metal ranges from about 0.01 to about 10 percent by weight.

3. The catalyst of claim 2 wherein the copper ranges from about 1 to about 10 percent by weight, the tin ranges from about 0.5 to about 5 percent by weight and the alkali metal ranges from about 0.2 to about 5 percent by weight.

4. The catalyst of claims 1, 2 or 3 wherein the support is alumina.

5. The catalyst of claims 1, 2 or 3 wherein the support is gamma alumina.

6. The catalyst of claims 1, 2 or 3 wherein the support is silica.

7. The catalyst of claims 1, 2 or 3 wherein the alkali metal is sodium or potassium.

8. In the process for preparing tertiary amines by reacting aliphatic, cycloaliphatic or araliphatic alcohols, aldehydes or ketones having up to twenty-five carbon atoms with ammonia, primary or secondary amines having from one to eight carbon atoms in a reducing atmosphere at a temperature of from about 160° C. to about 350° C. wherein the alkyl moiety of the alcohol, aldehyde or ketone replaces the hydrogen(s) on the ammonia primary or secondary amine, the improvement which comprises carrying of the reaction in the presence of a catalyst comprising from about 0.05 to about 50 percent by weight of copper, from about 0.05 to about 50 percent by weight of tin and from about 0.003 to about 30 percent by weight of an alkali metal supported on a porous carrier.

9. The process of claim 8 wherein the copper ranges from about 0.5 to about 20 percent by weight, the tin ranges from about 0.5 to about 20 percent by weight and the sodium ranges from about 0.01 to about 10 percent by weight.

10. The process of claim 9 wherein the copper ranges from about 1 to about 10 percent by weight, the tin ranges from about 0.5 to about 5 percent by weight and the alkali metal ranges from about 0.2 to about 5 percent by weight.

11. The process of claims 8, 9 or 10 wherein the support is alumina.

12. The process of claims 8, 9 or 10 wherein the support is gamma alumina.

13. The process of claims 8, 9 or 10 wherein the support is silica.

14. The process of claims 8, 9 or 10 wherein the alkali metal is sodium or potassium.

15. The process of claim 8, 9 or 10 wherein the reducing atmosphere is hydrogen.

16. The process of claims 8, 9 or 10 wherein the reducing atmosphere is hydrogen maintained at a partial pressure from about 15 to about 400 psi.

17. The process of claims 8, 9 or 10 wherein the temperature ranges from about 180° to about 300° C.

18. The process of claims 8, 9 or 10 wherein the temperature ranges from about 250° to about 300° C.

* * * * *